May 24, 1966  R. L. WHITELAW  3,252,286
GAS TURBINE POWER PLANT
Filed Feb. 15, 1965  2 Sheets-Sheet 2
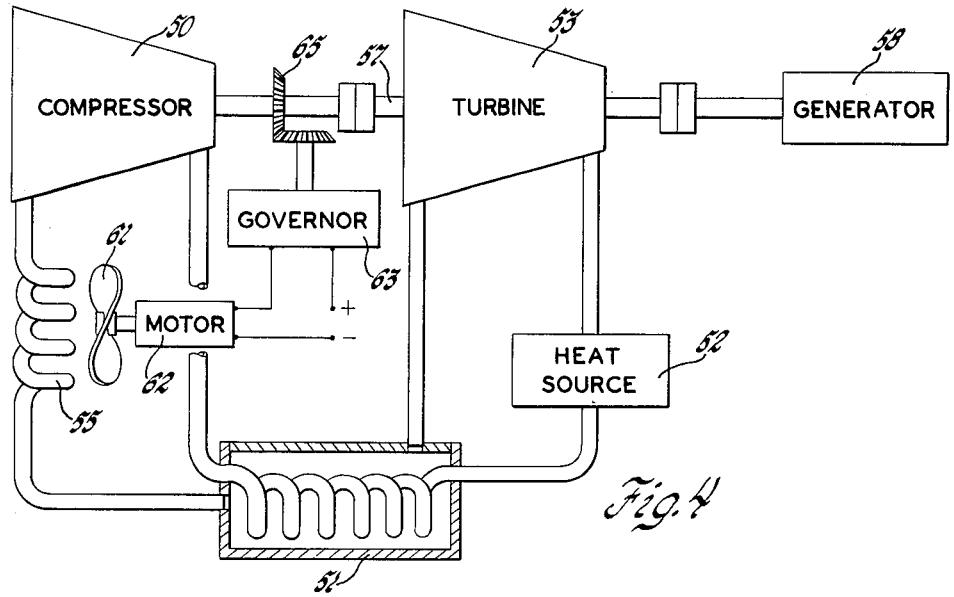
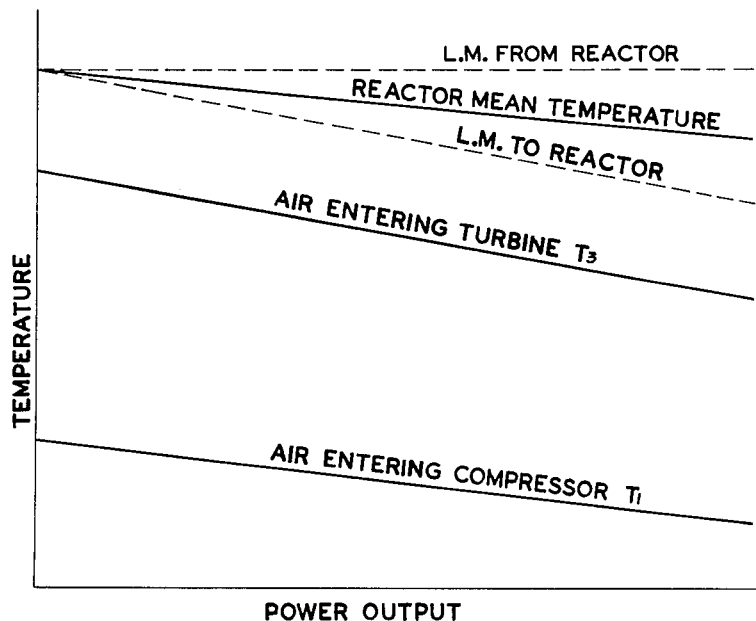
INVENTOR.
Robert L. Whitelaw
BY
Paul Fitzpatrick
ATTORNEY

United States Patent Office 3,252,286
Patented May 24, 1966

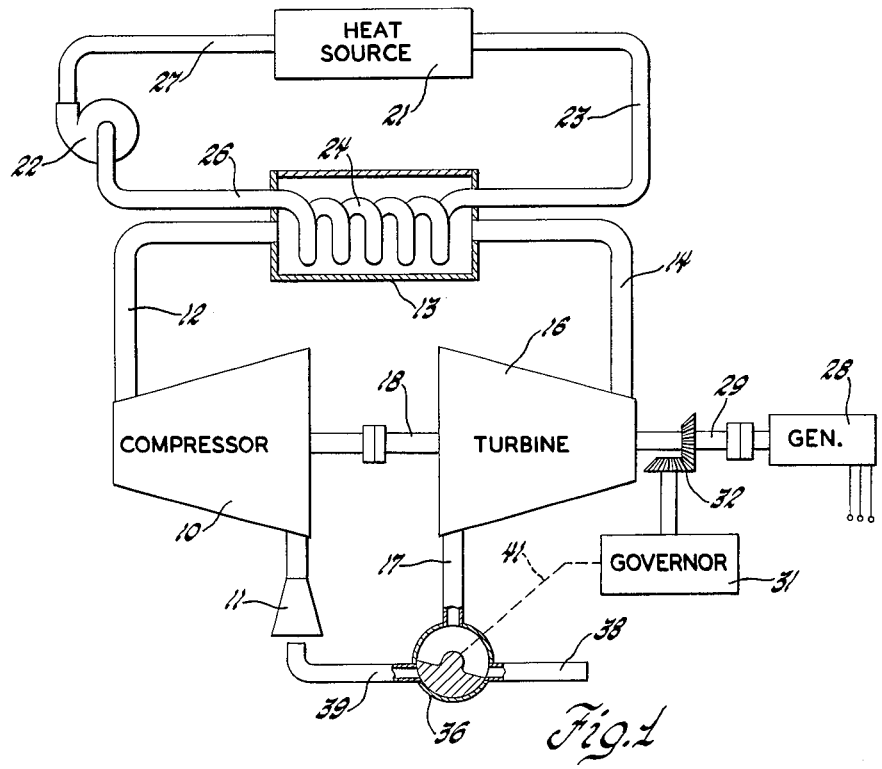
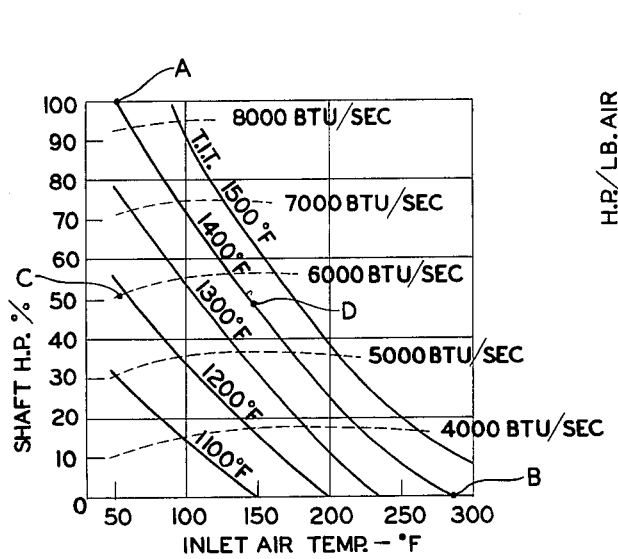
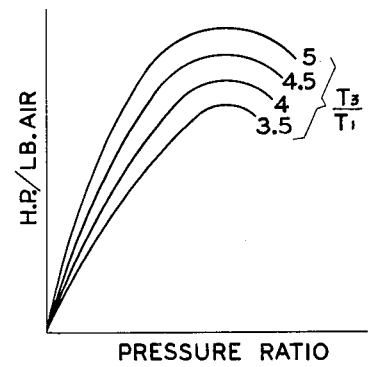

3,252,286
GAS TURBINE POWER PLANT
Robert L. Whitelaw, Indianapolis, Ind., assignor to General Motors Corporation, Detroit, Mich., a corporation of Delaware
Filed Feb. 15, 1965, Ser. No. 432,748
8 Claims. (Cl. 60—59)

My invention relates to gas turbine power plants. In such power plants, the usual way to control the output of the power plant is to vary the amount of heat energy supplied. Ordinarily, this involves the control of the fuel supplied the power plant by means of a governor, torque meter, or other device which responds to the speed or power output of the turbine or, alternatively, by means responsive to turbine temperature or some other parameter limiting the power output. In the application of gas turbines to drive more or less constant speed loads, such as alternators, the normal control means is a speed governor which acts upon deviation of speed of the turbine engine from the desired value to increase or decrease fuel and thus maintain a correct speed. Of course, safety and starting controls and various refinements may be included, but the fuel regulating governor is the basic control.

My invention is based upon the concept that reduction in specific output (i.e., power delivered per lb. of air flow) of the turbine cycle may be the means to control power output and thus hold turbine speed constant instead of control of fuel. In certain circumstances, it may be more feasible to reduce the efficiency of the gas turbine power plant than to reduce the activity of the heat source. Examples of this may arise in such circumstances as waste heat power plants, geothermal power plants, and power plants deriving energy from some sort of nuclear reaction.

It is a general principle of gas turbine power cycles that specific power is a function of compressor ratio, which is related to speed, and the ratio of maximum temperature to inlet temperature. This ratio may be expressed as $T_3/T_1$ where $T_3$ is absolute turbine inlet temperature and $T_1$ is absolute compressor inlet temperature. In applying my invention to a gas turbine power plant, the temperature of the air entering the compressor is varied by some control means such as a speed governor so that the attendant variation of $T_3/T_1$ provides a control over the output of the power plant.

In an open circuit gas turbine plant this variation in inlet temperature may be effected by directing a controlled proportion of the hot turbine exhaust gas to the compressor inlet. In a closed circuit power plant the variation in compressor inlet temperature may be accomplished by varying the amount of heat extracted from the air in the cooler which is always provided to cool the turbine exhaust gas before it reenters the compressor. The turbine inlet temperature may preferably be maintained approximately constant but, at any rate, the temperature of the air entering the compressor increases with decreasing load sufficiently that the ratio $T_3/T_1$ decreases as load on the turbine is decreased so that the specific output of the power plant decreases with diminishing load.

It may be pointed out that it is a general characteristic of most nuclear reactors that the reactivity diminishes as mean temperature in the reactor increases. Since most thermodynamic engines such as gas or steam turbines demand an increase in maximum temperature in order to deliver more power, a nuclear-powered thermodynamic engine is confronted with two mutually incompatible conditions. This incompatibility can be circumvented by one of several expedients: One, by artificially changing the reactivity of the reactor by moving its control rods:
Another is to increase the speed of the reactor cooling circulating pumps as power increases. Still another, in the case of the steam cycle, is to allow the steam pressure to rise to much higher values as power diminishes. For various reasons these methods are undesirable.

My invention provides for eliminating this incompatibility without resorting to any such undesirable devices, as will be seen. The nature of the invention and the advantages thereof will be apparent to those skilled in the art from the succeeding detailed description of preferred embodiments of the invention and the accompanying drawings, in which:

FIGURE 1 is a schematic diagram of an open circuit gas turbine power plant embodying the invention;

FIGURE 2 is a chart illustrative of the effect of variations of compressor inlet temperature on engine power output;

FIGURE 3 is a chart illustrating the effect of the ratio $T_3/T_1$ on specific output;

FIGURE 4 is a schematic diagram of a closed circuit power plant embodying the invention; and FIGURE 5 is a chart illustrative of the variation of reactor mean temperature, turbine inlet temperature and compressor inlet temperature with power output.

Before proceeding to a description of the power plants of FIGURE 1 and FIGURE 5, it may be well to consider FIGURES 3 and 4 which are illustrative of general principles underlying such power plants. FIGURE 3 illustrates the specific output in horsepower per pound of air as a function of compressor pressure ratio for different values of $T_3/T_1$. It will be apparent that the output decreases as the temperature ratio decreases. Thus, the power output may be decreased by raising $T_1$. FIGURE 5 illustrates general variations of temperature in a power plant such as that illustrated in FIGURE 1 in which a constant speed pump circulates liquid metal through a nuclear reactor and a heat exchanger which heats the motive fluid for a gas turbine. By increasing $T_1$ as power diminishes the temperature $T_3$ of the air entering the turbine will also increase, but the ratio of $T_3$ to $T_1$ decreases. Thus, as $T_3$ increases, the temperature difference across the heat exchanger by which the turbine is heated can be allowed to decrease, as it must with decreasing power. However, at the same time the mean reactor temperature will increase with decreasing power as is compatible with the nature of the reactor. Incidentally, in FIGURE 5 the lines identified as "L.M. From Reactor" and "L.M. to Reactor" indicate temperature of the liquid metal flowing from and to the reactor. In the case of a single loop nuclear plant in which the turbine air directly cools the reactor, the curve of $T_3$ would be the reactor exit temperature and would fall with increasing power as required. Thus, it can be seen that due to the variation of $T_1$ the reactor can automatically generate the increased power required at higher loads without recourse to control rod movement or changes in coolant pump speed. The variation of reactor output would be the result of its own variation of reactivity with temperature.

The first embodiment of the invention is an open circuit gas turbine plant employing feedback of turbine discharge gas to the compressor inlet, as shown in FIGURE 1. The power plant comprises a compressor 10 supplied from an atmospheric air inlet 11 and discharging through a duct 12, a heat exchanger 13, and a duct 14 to the inlet of turbine 16. Turbine 16 exhausts through an outlet duct 17.

Turbine 16 is coupled by shafting 18 to drive the compressor 10. Energy for operation of the engine supplied by a heat source 21, and, as illustrated, by indirect supply of heat from the heat source to the turbine through the heat exchanger 13. A pump 22, driven by any suitable power source, circulates a heat exchange medium such as liquid metal through the heat source, a line 23, coil 24 of the exchanger 13 and lines 26 and 27 back to the heater. Obviously, the air flowing from the compressor to the turbine could be directed through the heat source so that it is heated directly by whatever source of energy the heater embodies.

The turbine 16 (or a second or free turbine in series with turbine 16) is coupled to a load such as an alternator 28 through shafting 29. It is desired to drive the alternator at constant speed notwithstanding variations in the load supplied by it. For this purpose, a controlling device such as a governor 31 is provided. The governor may be driven through gears and shafting 32 from the turbine output shaft 29, or may respond to such conditions as alternator phase angle, for example. The governor 31 may be any such device as might in the usual gas turbine engine control the supply of fuel to a combustion device which energizes the power plant. In my invention, however, instead of controlling the supply of fuel, it acts to control a valve 36 which diverts a portion of the exhaust gases discharged through the turbine outlet 17 into the inlet 11 of the compressor. The valve 36 has an inlet from 17, an atmospheric outlet 38, and an outlet 39 which discharges into the compressor inlet 11. As shown, rotation of the valve may send anything from 0% to 100% of the exhaust gases into a position to be drawn into the compressor 10. Actually, about 30% diversion is sufficient for full control. The valve 36 may be controlled by the governor through any suitable servomechanism and control linkage, illustrated schematically by the broken line 41 on the drawing.

It will be seen from the foregoing that the power plant differs from the usual open circuit gas turbine power plant by the provision of control means for directing a variable proportion of the turbine exhaust gases into the compressor inlet. By effecting this control, the power output of the turbine may be varied over a very substantial range in accordance with load variations, as will be clearly apparent from the curves of FIGURE 2 which represent characteristics of a typical gas turbine power plant.

Referring to FIGURE 2, the solid line curves represent turbine inlet temperatures from 1500 down to 1100 degrees F. The abscissa is compressor inlet air temperature in degrees F. and the ordinate is percent of full rated shaft horsepower from zero to 100%. The broken line curves represent external heat input to the power plant. Let us assume, for example, that 1400° F. is normal turbine inlet temperature. At point A on this characteristic line, the engine will deliver 100% horsepower at 60° F. inlet air temperature. If the inlet air temperature is increased, the power output falls off quite rapidly and, at about 280° F. inlet air temperature, the shaft horsepower output is zero. In other words, the engine is simply idling. If we assume, for example, that operation is at point A under normal full load and the load drops to fifty percent, then the turbine could run on speed at point D on the 1400° F. curve which is at fifty percent power and which will be seen to be at about 150° F. inlet air temperature. In the usual open circuit gas turbine engine, the reduction in power would be effected by lowering the rate of fuel supply so that the engine would be operating at such a point as C as indicated on the curve where turbine inlet temperature is about 1185°.

It will be appreciated that turbine inlet temperature may vary to some extent, but with a more or less constant temperature heat source such as a source of waste heat, a geothermal installation, or in some cases a nuclear reactor applied as the heat source, the turbine inlet temperature will remain relatively constant as determined by the temperature of the source. Variation in work output is thus effected by diverting more or less exhaust gases into the compressor to vary the inlet air temperature and thus the efficiency of the power plant. In this connection, it will be apparent that so diverting exhaust gases reduces the energy intake of the power plant but reduces the efficiency and thus reduces power output to a greater extent.

In the case of a power plant of any reasonable size, the valve 36 must be a relatively large high temperture valve. However, such valves are known and have been employed in various systems for conducting hot air and gases. For this reason, there is no need to detail the construction of such a valve and it is represented only schematically in the drawing.

FIGURE 4 illustrates a typical simple closed circuit gas turbine plant. In this power plant the motive fluid, which may be air or other gas, is compressed in compressor 50 and is heated first in the regenerator 51 and then in a heat source 52 from which it is delivered to the inlet of turbine 53. After expansion in the turbine, it flows back through the regenerator 51 and cooling coil 55 to the inlet of the compressor. The heat source may be an indirect source such as the heat exchanger 13 of FIGURE 1 heated by any suitable source of heat, or the motive fluid may be in direct heat exchange relation with a source of heat such as the nuclear reactor, or waste heat or geothermal sources previously referred to. As in FIGURE 1, the turbine is coupled by shafting 57 to drive the compressor and is also coupled to a load device such as a generator 58. The regenerator 51 is any suitable device for transfer of heat from the turbine exhaust gas to the compressor discharge gas such as a fixed heat exchanger or a rotary regenerator. The control of compressor inlet temperature $T_1$ is accomplished by varying the effectiveness of the cooler 55. As illustrated, this is cooled by ambient air circulated by a fan or blower 61 driven by a variable speed motor 62. This motor is supplied from any suitable power source and is controlled by governor 63 driven off the compressor-turbine shaft 57 by gears 65. In operation, the governor acts upon overspeed of the turbine to decrease the speed of motor 62 and thus raise the compressor inlet temperature and decrease turbine power output. Obviously, any other means of control of the cooling can be employed, such as regulating the amount of cooling water supplied to a water-cooled heat exchanger or recirculating a portion of the cooling water already heated in the cooler. In other words, the means by which the inlet air temperature is varied is not significant. The significant point is that it is varied under such control as to increase compressor inlet air temperature to when the turbine output needs to be decreased.

It will be realized by those skilled in the art from the foregoing that that my invention represents a new approach to the utilization of energy from an essentially constant temperature source and conversion of the same into useful work through a gas turbine power plant. In my invention, the power output of the engine is reduced by increasing compressor inlet temperature rather than by reducing turbine inlet temperature as is usual.

This mode of operation or control is well suited to use with nuclear reactors because it raises reactor temperature and thus lowers heat output as the load decreases.

Various emergency or safety controls may be incorporated in the system but are immaterial to the disclosure of my invention.

The term "heat source" as used in the succeeding claims may be interpreted as the original heat source or as an element such as a heat exchanger through which the heat is delivered to the air circuit of the gas turbine; or as both the original source and a heat exchanger.

It will be apparent that many modifications may be made within the scope of the invention, and that the detailed description of this preferred embodiment thereof is not to be considered as limiting or restricting the invention.

I claim:
1. An open-circuit gas turbine power plane comprising, in combination, a compressor having an inlet, a heat source, and a turbine having an outlet, connected for flow of gas from the inlet through the compressor, the heat source, and the turbine to the outlet, the turbine being connected to drive the compressor; means operable to divert a variable proportion of the motive fluid from the turbine outlet to the compressor inlet; and a controlling device responsive to turbine operation coupled to said means so as to vary the said proportion.

2. An open-circuit gas turbine power plant comprising, in combination, a compressor having an inlet, a heat source, and a turbine having an outlet, connected for flow of gas from the inlet through the compressor, the heat source, and the turbine to the outlet, the turbine being connected to drive the compressor; means operable to divert a variable proportion of the motive fluid from the turbine outlet to the compressor inlet; and a controlling device responsive to turbine speed coupled to said means so as to increase the said proportion as speed increases.

3. An open-circuit gas turbine power plant comprising, in combination, a compressor having an inlet, a heat source, and a turbine having an outlet, connected for flow of gas from the inlet through the compressor, the heat source, and the turbine to the outlet, the turbine being connected to drive the compressor and an external load; means operable to divert a variable proportion of the motive fluid from the turbine outlet to the compressor inlet; and a controlling device responsive to turbine load coupled to said means so as to increase the said proportion as the load decreases.

4. A gas turbine power plant comprising, in combination, a compressor, a heat source, and a turbine, connected for flow of gas through the compressor, the heat source, and the turbine, the turbine being connected to drive the compressor; means operable to vary the temperature of the gas entering the compressor; and a controlling device responsive to turbine operation coupled to said means so as to vary the said temperature and thereby the power output of the power plant.

5. A power plant is recited in claim 4 in which the controlling device responds to turbine load.

6. A gas turbine power plant comprising, in combination, a compressor, a heat source, and a turbine, connected for flow of gas through the compressor, the heat source, and the turbine, the turbine being connected to drive the compressor; means operable to vary the temperature of the gas entering the compressor; and a controlling device responsive to turbine speed coupled to said means so as to vary the said temperature and thereby the power output of the power plant.

7. A power plant as recited in claim 6 including a cooler conducting gas from the turbine to the compressor and in which the control device varies the amount of heat removed by the cooler.

8. A power plant as recited in claim 6 including means for diverting a variable proportion of the motive fluid from the turbine into the compressor and in which the controlling device controls the diverting means.

References Cited by the Examiner
UNITED STATES PATENTS

| | | | |
|---|---|---|---|
| 2,203,731 | 6/1940 | Keller | 60—59 |
| 2,642,721 | 6/1953 | Mallinson | 60—59 |

EDGAR W. GEOGHEGAN, *Primary Examiner.*